UNITED STATES PATENT OFFICE 2,614,135

SELECTIVE ADSORPTION OF NONPOLAR ORGANIC COMPOUNDS

Alfred E. Hirschler, Drexel Hill, Pa., assignor to Sun Oil Company, Philadelphia, Pa., a corporation of New Jersey No Drawing. Application August 30, 1950, Serial No. 182,425

13 Claims. (Cl. 260—674)

This invention relates to the selective adsorption of non-polar organic compounds from each other by means of an improved adsorbent composition.

More specifically, the invention relates to a method of effecting separations by selective adsorption in which the adsorbent employed comprises silica gel which has been treated with a silane compound, as hereinafter specified, adapted to reduce the affinity of the silica gel for polar compounds without correspondingly reducing its affinity for non-polar constituents which are to be adsorbed from the starting mixture.

The separation of various non-polar compounds from each other by utilizing certain selective adsorbents is known in the prior art. Examples of this type of separation may be found in the hydrocarbon field, wherein the resolution of numerous hydrocarbon mixtures into constituent hydrocarbons or hydrocarbon types by means of adsorbents has been disclosed. Thus the separation of less saturated from more saturated hydrocarbons, such as aromatics from saturates (i. e. paraffins and naphthenes), olefins from saturates, or aromatics from olefins, is well known. Also, several adsorption procedures for selectively removing one saturate hydrocarbon from another have been disclosed. Hydrocarbon separations have been effected by contacting the adsorbent with charge mixtures both in liquid phase and in vapor phase, although the two types of operations do not necessarily give equivalent results.

While various selective adsorbents have been proposed for hydrocarbon separations, silica gel has perhaps been most widely employed. It has a high selectivity for less saturated hydrocarbons as compared to more saturated hydrocarbons and good adsorption capacity. Silica gel has been utilized for separating aromatics from gasoline or kerosene (Patent No. Re. 23,005), for removing aromatics from gas oil or lubricating oil (Patent No. 2,441,572) and for separating olefins from saturate hydrocarbons (Patent No. 2,459,442), and also for making such separations as an aromatic from an aromatic (Patent No. 2,448,489), a naphthene from a naphthene (Patent No. 2,448,488) and a parafin from a naphthene (Patent No. 2,464,931).

Hydrocarbon materials which are treated with silica gel for purpose of separating the hydrocarbon constituents from each other usually contain polar compounds in at least trace amounts, which compounds cause the silica gel to decline in activity over a continued period of use. For example, petroleum fractions such as gasoline, kerosene, gas oil and lubricating oil contain minor amounts of organic compounds containing sulfur, oxygen and nitrogen and also contain trace amounts of water. These fractions are generally treated in a cyclic or continuous operation in which the charge is contacted with silica gel to selectively adsorb unsaturated hydrocarbon constituents, the silica gel is then treated with an organic liquid desorbing agent such as a saturate or aromatic hydrocarbon which boils below the boiling range of the charge to displace the adsorbed hydrocarbon, and the adsorbent is then re-used for further treatment of charge material. Over the course of a prolonged operation of this type, the polar compounds present in the charge tend to accumulate on and be held by the adsorbent, and consequently the activity of the silica gel for adsorbing the hydrocarbons continuously declines. After a time the activity becomes sufficiently low that the silica gel must either be discarded and replaced with fresh adsorbent or else subjected to an expensive regeneration suitable for removing the polar materials and restoring the activity.

The present invention provides a new silica gel adsorbent composition which has reduced affinity for polar compounds such as water and organic compounds that contain sulfur, oxygen or nitrogen and which therefore has prolonged life in effecting separations of hydrocarbon mixtures.

According to the invention the adsorbent employed comprises silica gel which has been treated with a silane compound having the general formula $$R_k H_m Si X_n$$

In the formula R represents a hydrocarbon or hydrocarbonoxy radical and $k$ is a whole number from one to three inclusive; and when $k$ is more than one, R can represent the same or different radicals of the types specified, but in any case at least one R contains at least three carbon atoms. X represents an amino radical or a halogen radical and $n$ is a whole number from one to three inclusive. Subscript $m$ represents a whole number from zero to two inclusive. The sum of $k$, $m$ and $n$ of course must be four to satisfy the valences of the silicon atom.

The compounds encompassed within the foregoing formula thus can be mono-, di- or tri-amino silanes, or mono-, di- or tri-halogeno silanes (if the latter, preferably chloro- or bromo-silanes). They contain from one to three hydrocarbon or hydrocarbonoxy groups, or up to three such groups including both, one or more of which has at least three carbon atoms. Examples of such groups are alkyl, alkoxy, cycloalkyl, cycloalkoxy, aryl and aryloxy radicals. They also either may or may not contain one or two hydrogen atoms attached directly to the silicon atom but preferably contain none.

In addition to the foregoing limitations the silane compounds used for preparing the new adsorbent composition according to the invention should not be of too large molecular size; otherwise they may tend to plug up the pores of the silica gel and greatly reduce adsorption capacity. This will depend upon the number and sizes of the R groups attached to the silicon. The suitability of the silanes in this respect may be measured by means of their solubility in pentane. For the purposes of the present invention the compounds should have a solubility in pentane of at least 1% by weight at room temperature. Silanes which are soluble in amount less than 1% will be of sufficient molecular size to be undesirable for use in preparing the new silica gel adsorbent.

Preparation of the adsorbent can be carried out by contacting silica gel with the silane in liquid phase or in vapor phase if it is sufficiently volatile. In case the gel contains any adsorbed moisture it is desirable first to dry it by mild heating. Preferably the treatment with silane is conducted by dissolving a minor amount, say 0.5–15% by weight, of the silane in a hydrocarbon solvent such as pentane or benzene and then contacting the silica gel with a sufficient amount of the solution either to saturate the gel with silane or at least to cause it to have substantially altered adsorption characteristics. When sufficient silane is used to saturate the gel, the amount required will vary dependent upon the particular compound selected for use. Advantageously the adsorbent is heated to a temperature of the order of 200° F. or higher to insure affixation of the silane to the gel surfaces. This can be done by heating the adsorbent from an external source after it has been treated with the silane or merely by preheating the silane-solvent mixture before it is contacted with the silica gel. After the silane has been securely affixed to the gel surfaces, any unreacted excess is removed by washing the adsorbent with an organic solvent such as pentane, benzene, acetone, ether, alcohol or the like. Prior to use the adsorbent may be dried to remove any remaining solvent by heating, blowing with inert gas, evacuation or combinations of such procedures. Where a hydrocarbon solvent such as pentane or benzene has been used, the drying step may be omitted and the adsorbent can be used directly for treatment of the hydrocarbon charge, as the charge itself will function to displace the solvent.

Examples of silane compounds of the class above described are as follows: propyl silicon trichloride; amyl silicon trichloride; octyl silicon trichloride; octadecyl silicon trichloride; dichloride and monochloride silanes corresponding to the foregoing but having either one or two of the chlorine atoms replaced by hydrocarbon groups such as methyl, butyl, octyl, benzyl, etc.; silanes similar to any of the foregoing compounds but having one or more of the hydrocarbon groups replaced by corresponding hydrocarbonoxy groups; compounds as above containing bromine instead of chlorine; compounds as above containing amino groups in place of chlorine. Examples of particularly effective compounds for purposes of this invention are amyl trichlorosilane, octyl trichlorosilane and butoxy octadecoxy diaminosilane, the latter being especially useful in view of the small amount required to improve the properties of silica gel.

In making hydrocarbon separations with the silane treated silica gel, any known or suitable procedure for carrying out processes of this type may be employed. The operation can be conducted with a fixed bed of adsorbent through which the hydrocarbon mixture to be treated and the desorbing agent are successively passed, or with a moving bed of adsorbent which passes countercurrent to the charge to effect selective adsorption and then countercurrent to the desorbing agent to displace the adsorbate. The operation can also be conducted with the adsorbent showering or falling through the charge and through the desorbing agent. Such procedures are known in the art and need not be described in detail herein.

*Example 1*

A batch of silica gel was mixed for about one hour with a solution of 0.5% by weight of a commercial silane product composed mainly of tert-butoxy octadecoxy diaminosilane dissolved in pentane, an excess of the solution being used so as to saturate the gel with the silane. The gel was then dried by evaporating the pentane, after which it was heated to 120° C. for about 1.5 hours. The dried gel was washed at room temperature with benzene and then with pentane until the excess silane had been removed. It was then dried by heating to about 210° C. and blowing with nitrogen. The treated gel was tested qualitatively for water repellency by mixing a sample of it with water and then observing the amount which floated on the surface. It was found that only a small part sank to the bottom, whereas with the original untreated gel none remained floating. This indicates that the treatment gave the gel high water repellency.

The adsorbent was tested to determine whether its selectivity in adsorbing aromatic hydrocarbons in preference to saturate hydrocarbons had been altered by the foregoing treatment. This was done by equilibrating samples of the adsorbent with several liquid mixtures of toluene and n-heptane in which the component proportions were varied, and determining the compositions of the adsorbed and non-adsorbed phases. Such tests were made with both the original silica gel and the treated gel. The results showed that the selectivity of the treated and untreated gels for the aromatic component was about the same at all proportions of toluene to n-heptane. In other words treatment of the gel did not cause any substantial change in the composition of the adsorbed phase in equilibrium with a given composition of non-adsorbed liquid.

The treated adsorbent was used in a cyclic operation for separating aromatics from a naphtha fraction having a boiling range of about 300–400° F. and an aromatic content of about 14% by volume and containing about 47 p. p. m. of dissolved water. A column of about 1″ I. D. and 33″ height, packed with 100 grams of the adsorbent, was used. In each cycle a standard amount of the naphtha was passed into the adsorbent, and this was followed by a standard amount of benzene to displace the adsorbed naphtha aromatics. The adsorbent was then reused in the next cycle by following the benzene immediately with another standard amount of naphtha. At various times during the operation the adsorption capacity of the adsorbent relative to that at the beginning of the operation was determined, so as to ascertain the effect of poisoning of the adsorbent by polar constituents in the charge. The original untreated silica gel was also used in a cyclic operation carried out in like manner for purpose of comparison. Adsorption capacities, relative to a capacity taken to be 100 for the adsorbent at the beginning of each cyclic operation, were found to be as follows:

|  | Relative Adsorption Capacities | |
|---|---|---|
|  | Untreated Gel | Treated Gel |
| after 300 cycles | 78 | 94 |
| after 500 cycles |  | 91 |

These results show that the treated adsorbent remains useful in a continuous operation for a considerably longer period of time than the original silica gel.

*Example 2*

Another batch of silica gel was treated with a 5% by volume solution of di-tert-butoxy diaminosilane in pentane, then dried and heated to 120° C. for 1.5 hours, then washed with pentane to remove excess silane, and finally blown with nitrogen at about 155° C. The treated gel was found to have good water repellency when tested in the manner described above, although it was not as repellent as the treated adsorbent in the preceding example.

*Example 3*

Another batch of silica gel was treated with a 5% by volume solution of amyl trichlorosilane in pentane, dried and heated to 120° C. for 1.5 hours, then washed with benzene followed by pentane, and finally blown with nitrogen at about 175° C. Water repellency of the treated gel was about the same as for the adsorbent prepared according to Example 1.

Selectivity tests made with mixtures of toluene and n-heptane as in Example 1 showed that the treated adsorbent had about the same selectivity for aromatics in preference to saturates as the original silica gel.

A cyclic operation was carried out with the treated adsorbent under essentially the same conditions as described in Example 1. Results were as follows:

|  | Relative Adsorption Capacities | |
|---|---|---|
|  | Untreated Gel | Treated Gel |
| after 300 cycles | 78 | 98 |
| after 500 cycles |  | 97 |
| after 750 cycles |  | 92 |

These results show that treatment of the adsorbent gave it considerably prolonged life.

*Example 4*

Another sample of silica gel was treated in the manner described in Example 3 except that a 7.8% by volume solution of octyl trichlorosilane was used. The resulting adsorbent was found to be extremely water repellent; all of it floated on the water even after prolonged contact therewith.

Selectivity tests carried out as described in Example 1 showed that the original silica gel and the treated adsorbent had about the same selectivity for aromatics.

A cyclic operation charging the naphtha specified in Example 1 and with the conditions essentially the same gave the following results:

|  | Relative Adsorption Capacities | |
|---|---|---|
|  | Untreated Gel | Treated Gel |
| after 300 cycles | 78 | 86 |

These results show that the life of the gel was prolonged but not so effectively as when amyl trichlorosilane was used, even though the octyl trichlorosilane-treated gel had the greater water repellency. Apparently the latter adsorbent tended to be poisoned somewhat more by the organic polar constituents in the charge naphtha.

*Example 5*

Another batch of silica gel was treated with phenyl trichlorosilane in the same manner as in Example 3 except that a 6.3% by volume solution in pentane was used. The treatment considerably increased the water repellency but not as much as when the amyl trichlorosilane of Example 3 was used.

Selectivity tests made as described in Example I showed that the selectivity for aromatics was essentially the same as for the untreated silica gel.

While the foregoing description has been made largely with reference to the separation of hydrocarbon mixtures, it will be understood that the invention has utility in the separation of mixtures composed mainly of other non-polar organic compounds but containing small amounts of polar constituents which tend to adversely affect the life of conventional silica gel adsorbents.

I claim:

1. Method for selectively adsorbing a non-polar organic compound from a mixture of non-polar organic compounds which comprises treating the mixture with an adsorbent composition comprising silica gel which has been treated with a silane having the general formula $$R_k H_m Si X_n$$

wherein R represents a radical selected from the group consisting of alkyl, cycloalkyl, aryl, alkoxy, cycloalkoxy and aryloxy radicals and at least one R is a radical containing at least three carbon atoms, X is a radical selected from the group consisting of halogen and amino radicals, $k$ and $n$ are whole numbers from 1 to 3 and $m$ is a whole number from 0 to 2, the sum of $k$, $n$ and $m$ being 4, said silane being soluble in pentane at room temperature to the extent of at least 1% by weight.

2. Method for selectively adsorbing a hydrocarbon from a mixture of hydrocarbons which comprises treating the mixture with an adsorbent composition comprising silica gel which has been treated with a silane having the general formula $$R_k H_m Si X_n$$

wherein R represents a radical selected from the group consisting of alkyl, cycloalkyl, aryl, alkoxy, cycloalkoxy and aryloxy radicals and at least one R is a radical containing at least three carbon atoms, X is a radical selected from the group consisting of halogen and amino radicals, $k$ and $n$ are whole numbers from 1 to 3 and $m$ is a whole number from 0 to 2, the sum of $k$, $n$ and $m$ being 4, said silane being soluble in pentane at room temperature to the extent of at least 1% by weight.

3. Method according to claim 2 wherein said silane is a diaminosilane having two R groups each of which is an alkoxy radical containing from 4 to 18 carbon atoms inclusive.

4. Method according to claim 2 wherein said silane is a butoxy octadecoxy diaminosilane.

5. Method according to claim 2 wherein said silane is a trichlorosilane and R is an alkyl group having 5 to 8 carbon atoms inclusive.

6. Method according to claim 2 wherein said silane is amyl trichlorosilane.

7. Method according to claim 2 wherein said silane is octyl trichlorosilane.

8. In a process wherein a hydrocarbon mixture is treated with an adsorbent to selectively adsorb a hydrocarbon constituent, the adsorbent is then treated with an organic liquid desorbing agent to displace the adsorbed constituent and the adsorbent is then re-used for further treatment of the hydrocarbon mixture, the improvement which comprises utilizing as the adsorbent silica gel which has been treated with a silane having the general formula $$R_k H_m Si X_n$$

wherein R represents a radical selected from the group consisting of alkyl, cycloalkyl, aryl, alkoxy, cycloalkoxy and aryloxy radicals and at least one R is a radical containing at least three carbon atoms, X is a radical selected from the group consisting of halogen and amino radicals, $k$ and $n$ are whole numbers from 1 to 3 and $m$ is a whole number from 0 to 2, the sum of $k$, $m$ and $n$ being 4, said silane being soluble in pentane at room temperature to the extent of at least 1% by weight, whereby deactivation of the adsorbent due to the presence of any trace amounts of water and organic polar compounds in said hydrocarbon mixture is minimized.

9. Process according to claim 8 wherein said silane is a diaminosilane having two R groups each of which is an alkoxy radical containing from 4 to 18 carbon atoms inclusive.

10. Process according to claim 8 wherein said silane is a butoxy octadecoxy diaminosilane.

11. Process according to claim 8 wherein said silane is a trichlorosilane and R is an alkyl group having 5 to 8 carbon atoms inclusive.

12. Process according to claim 8 wherein said silane is amyl trichlorosilane.

13. Process according to claim 8 wherein said silane is octyl trichlorosilane.

ALFRED E. HIRSCHLER.

REFERENCES CITED

The following references are of record in the file of this patent:

UNITED STATES PATENTS

| Number | Name | Date |
| --- | --- | --- |
| 2,514,580 | Hirschler | July 11, 1950 |
| 2,518,236 | Hirschler | Aug. 8, 1950 |